(12) United States Patent
Odinak et al.

(10) Patent No.: US 6,487,494 B2
(45) Date of Patent: Nov. 26, 2002

(54) SYSTEM AND METHOD FOR REDUCING THE AMOUNT OF REPETITIVE DATA SENT BY A SERVER TO A CLIENT FOR VEHICLE NAVIGATION

(75) Inventors: Gilad Odinak, Bellevue, WA (US); Marc Phillips, San Diego, CA (US); Nishith K. Chaubey, San Diego, CA (US)

(73) Assignee: Wingcast, LLC, Redmond, WA (US)

( * ) Notice: Subject to any disclaimer, the term of this patent is extended or adjusted under 35 U.S.C. 154(b) by 0 days.

(21) Appl. No.: 09/884,856

(22) Filed: Jun. 18, 2001

(65) Prior Publication Data

US 2002/0143463 A1 Oct. 3, 2002

Related U.S. Application Data

(60) Provisional application No. 60/280,378, filed on Mar. 29, 2001.

(51) Int. Cl.⁷ .............................................. G01C 21/00
(52) U.S. Cl. ..................... 701/202; 701/208; 701/211; 340/988; 342/357.09
(58) Field of Search ................................. 701/200, 201, 701/202, 208, 211, 213, 24, 25, 26; 342/357.06, 357.08, 357.09, 357.13, 988

(56) References Cited

U.S. PATENT DOCUMENTS 6,317,684 B1 * 11/2001 Roeseler et al. ............ 701/202

* cited by examiner

Primary Examiner—Yonel Beaulieu
(74) Attorney, Agent, or Firm—Black Lowe & Graham PLLC

(57) ABSTRACT

A system and method for reducing the amount of repetitive data sent by a server to a client for vehicle navigation. The system includes a computer-based vehicle unit located in a vehicle, a gateway configured to wirelessly send and receive trip information to and from the vehicle unit, and a computer-based server in communication with the gateway over a network. The vehicle unit wirelessly receives signals from a computer-based server that includes the desired navigation information in packet form. The vehicle unit includes a user interface component that presents the received navigation information and records user requests. The server processes the requests, generates a trip plan according to the navigation information and sends the generated trip plan back to the vehicle unit via a gateway when a request has been completed.

21 Claims, 3 Drawing Sheets

SYSTEM AND METHOD FOR REDUCING THE AMOUNT OF REPETITIVE DATA SENT BY A SERVER TO A CLIENT FOR VEHICLE NAVIGATION

PRIORITY CLAIMS

This application claims priority from Provisional Application filed Mar. 29, 2001, Ser. No. 60/280,378.

FIELD OF THE INVENTION

This invention relates generally to communication and computing systems and methods and, more specifically, to a system and method for directing a motorist to a destination.

BACKGROUND OF THE INVENTION

With advances in on-board vehicle computer systems and wireless technologies, vehicle navigation systems that provide users with current location and driving directions to a desired destination have become a reality. Vehicle navigation systems have taken one of two forms: on-board systems and network-based systems. On-board systems are driven by a computer and associated database resident in each vehicle. These systems generate driving instructions based on user voice or keyboard input and map information stored in the on-board computing system. Network-based navigation systems do not rely on an on-board computer and associated database, but rather provide a voice interface to an off-vehicle computer or human information provider.

Significant disadvantages exist with both forms of vehicle navigation systems. The on-board navigation system requires expensive and quickly outdated computer hardware. Moreover, with the on-board computing approach, the database needs to be updated periodically to maintain current navigation information. Indeed, such systems can never really be up to date or comprehensive as they rely on external updates, typically via a CD-ROM or other removable electronic storage medium. The network-based system requires an open wireless link to the server. In these systems, the user typically dials a number and gives their starting and ending addresses (current location and destination). The system computes the route and vocally recites it to the user turn by turn. If the user hangs up, or it otherwise disconnected, they need to call again and give their new location and the destination address. Maintaining an active phone connection, especially in a situation involving long distance travel, is inefficient and expensive, as well as distracting to the vehicle user.

Thus, there is a need for a system and method that addresses the disadvantages associated with current attempts at vehicle navigation systems.

SUMMARY

The present invention provides a system and method for reducing the amount of repetitive data sent by a server to a client for vehicle navigation. The system includes a computer-based vehicle unit located in a vehicle, a gateway configured to wirelessly send and receive trip information to and from the vehicle unit, and a computer-based server in communication with the gateway over a network. The vehicle unit wirelessly receives signals from a computer-based server that include the desired navigation information. The vehicle unit includes a user interface component that presents the received navigation information and record user requests. The server processes the requests, generates a trip plan according to the navigation information, and sends the generated trip plan back to the vehicle unit via a gateway when a request is completed.

The server includes a receiving component that receives information from the vehicle unit via the gateway, a trip plan generator that generates a plan according to navigation information, vehicle coordinates, and trip navigation instructions. The trip plan generated includes a table of locations for the trip plan associated with the navigation instructions. Along with the receiving component, the server includes a first sending component that sends the generated trip plan table to the vehicle unit via the gateway. The server also includes a transaction component that completes a transaction based upon the navigation instructions and the trip plan generated. The vehicle unit chooses navigation prompts included in the trip plan based on a comparison of the present vehicle coordinates and the trip plan. The chosen navigation prompts are dependent upon whether the vehicle coordinates are within a reasonable threshold value from the location associated with the navigation prompts.

In accordance with further aspects of the invention, the user requests include voice instructions.

In accordance with still further aspects of the invention, the user interface includes a microphone for recording voice instructions and a speaker for presenting received voice prompts audibly.

In accordance with yet other aspects of the invention, the transaction component includes a voice recognition processor configured to perform voice recognition processing of the recorded requests.

In accordance with other aspects of the invention, the navigation prompts include voice prompts.

In accordance with further aspects of the invention, if the vehicle coordinates are not within a reasonable threshold value from the location associated with the navigation prompts the vehicle unit contacts the server and requests a new trip plan using the current vehicle coordinates.

As will be readily appreciated from the foregoing summary, the invention provides a system and method for reducing the amount of repetitive data sent by a server to a client for vehicle navigation, as well as reduce the airtime required for such computation.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
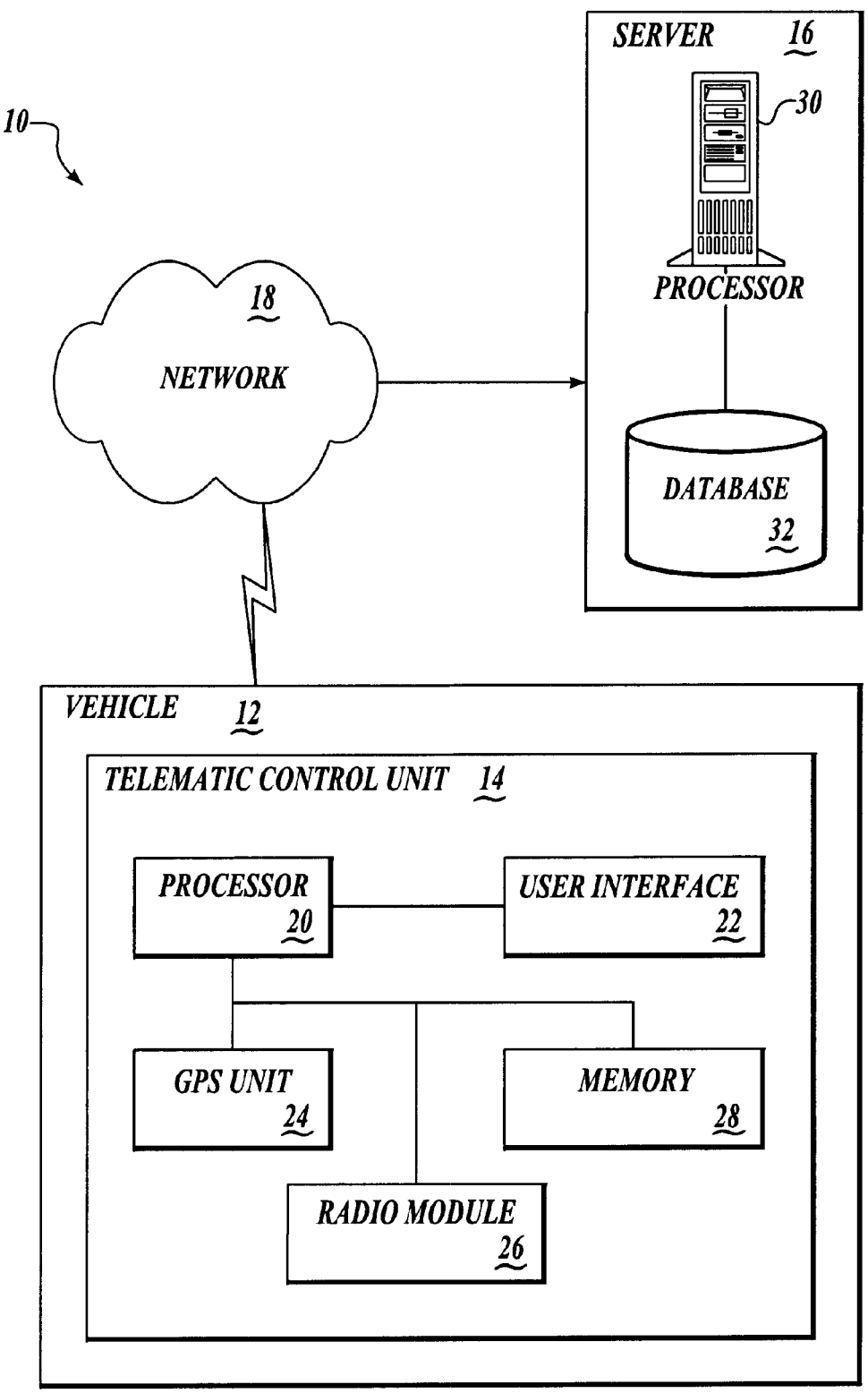
FIG. 1 is a diagram illustrating the general architecture of a system that operates in accordance with the present invention.

The present invention is a vehicle navigation system 10 that includes a vehicle 12 with an in-vehicle telematic control unit (TCU) 14. TCU 14 is in wireless communication with a server 16 over a network 18. Network 18 preferably includes components for receiving wireless signals from TCU 14 and converting the signals for wire or wireless transmission to server 16. The network is preferably the Internet, but could be any public or private data network. Network 18 includes a gateway (not shown) that can send and receive wireless signals to and from TCU 14, and can communicate through other components (e.g., routers) in the network to server 16. The wireless signals include information that is preferably in packet form, although the information may be in alternative forms. TCU 14 includes a processor 20 coupled to a user interface 22, a global positioning system (GPS) unit 24, a radio module 26 and local storage or memory 28. User interface 22 preferably includes a speaker and a microphone (not shown), and may include a display. The user interface may also include on-or-off screen user interface buttons. Radio module 26 is capable of sending and receiving both voice and data. Server 16 includes a processor 30 and a database 32 that holds vehicle navigation information: maps, road conditions and terrain, lane information and changes, touring instructions, etc.

System 10 of the present invention minimizes the amount of airtime used between TCU 14 and server 16 to send a trip plan. When a user asks the system for directions, the vehicle's local coordinates (as determined by GPS unit 24) are sent from TCU 14 to server 16 over network 18. The user also specifies their destination to the TCU. Entry of the user's navigation instruction request, including the destination information, is preferably done vocally through the microphone, but may be accomplished by other data entry means, such as via user interface buttons. The TCU transmits the vocalized destination to server 16. The server calculates the trip plan and generates a table of locations (expressed as location coordinates, such as GPS coordinates) and the corresponding navigation prompts (e.g. turn left onto Howel St.). These navigation prompts are preferably voice prompts, but may include other forms of user notification, such as textual messages or different audible, visual or other signals. The table with navigation prompts is sent to TCU 14 in vehicle 12. In an alternate embodiment, the navigation prompts are sent as an audio file (assuming voice prompts), such as a WAV file or an MP3 file. In another embodiment, the table includes locations identified in text form that are displayed or converted to audio by a text-to-speech (TTS) component of processor 20. The navigation prompts could also include symbols that indicate common words such as "turn," "left," "onto," "street," and "avenue," combined with the vocal recording of the name of the proper noun "Howell" street. As the vehicle moves according to the trip plan and arrives at a location whose GPS coordinates match those of an entry in the table, the corresponding voice prompt is played through the speakers to the system user. This process is described in more detail in FIG. 2.

Figure 2:
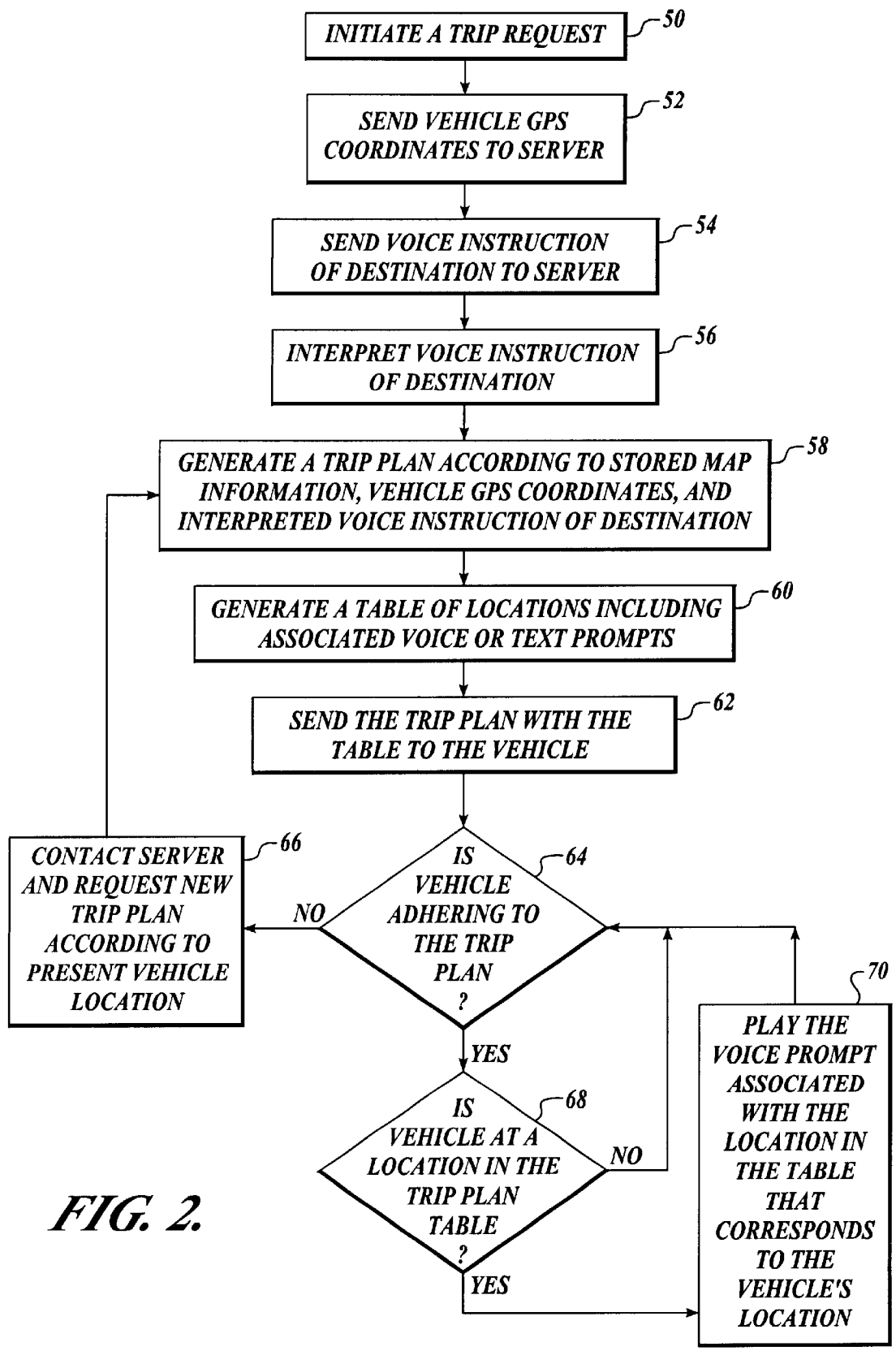
FIGS. 2 and 3 are flow charts illustrating various embodiments performed by the system shown in FIG. 1.

FIG. 2 is a flow diagram of a process performed by system 10 shown in FIG. 1. First, at block 50, the user initiates a trip request. Trip request initiation can occur in a number of ways. For example, the user may select a trip request button included in user interface 22, or speak a start trip request command into the microphone that is interpreted by voice recognition software executed by processor 20; either action causes processor 20 to begin a trip request. At blocks 52 and 54, the initiated trip request causes TCU 14 to send the vehicle's GPS coordinates and any user entered instructions of the destination to server 16. At block 56, server 16 interprets the voice instructions to determine the destination. Interpreting includes performing voice recognition processing. Next, at block 58, the server generates a trip plan according to vehicle navigation information such as stored map or other navigation information, the vehicle GPS coordinates, and the interpreted voice instructions of the destination. At block 60, a table of locations is generated for the trip plan. The table includes trip plan information, such as landmarks, turns, road changes or other significant travel-related information. Each location entry in the table includes an associated voice or text prompt. At block 62, the trip plan including the table is sent to the TCU.

At decision block 64, once the vehicle receives the trip plan table, TCU 14 determines if the vehicle is adhering to the trip plan. The TCU periodically checks the vehicle's GPS location and determines if it is on the trip plan or within a threshold value from the trip plan. This threshold value may be a function of the distance from a known location in the trip plan, or location relative to known geographic marks, or some combination of various factors. Within the threshold value, the system can document the present location of the vehicle in relation to the trip plan and chart the navigational path to return to the trip plan or a modified trip plan. If the vehicle is not adhering to the trip plan, the TCU contacts server 16 and requests a new trip plan according to the present vehicle location (block 66). If the TCU determines the vehicle is adhering to the trip plan, the TCU determines whether the vehicle is at an identified location within the trip plan table (decision block 68). If the vehicle is not at a location identified in the trip plan table, the process continues checking locations according to decision blocks 64 and 68. If the vehicle is at a location in the trip plan table or within a threshold value from a location in the table, TCU 14 plays the voice prompt associated with the location in the table that corresponds to the vehicle's location (block 70). In another embodiment, voice recordings associated with pre-stored symbols are played in series with a proper-noun street identifier. Then, the process continues checking vehicle location according to decision blocks 64 and 68.

In an alternate embodiment, the system may cache parts of a voice prompt that are later combined by processor 20 to create a navigation instruction. For example, TCU 14 receives the following voice prompts from server 16:

(a) "turn left onto Howel Street";

(b) "turn left onto 4th Avenue".

A caching component performed by processor 20 caches 3 sub-prompts:

17 "turn left"

18 "Howell Street"

19 "4th Avenue".

The tag identifiers for the (a) and (b) voice prompts include tag identifiers for the sub-prompts (i.e. a=#17 #18; b=#17 #19). So in effect, in this alternate embodiment, each tag is a series of sub-tags. Server 16 may send just the tag identifiers for the sub-prompts. Processor 20 combines the sub-prompts according to the order the tag identifiers were received and presents the combination to the user.

Figure 3:
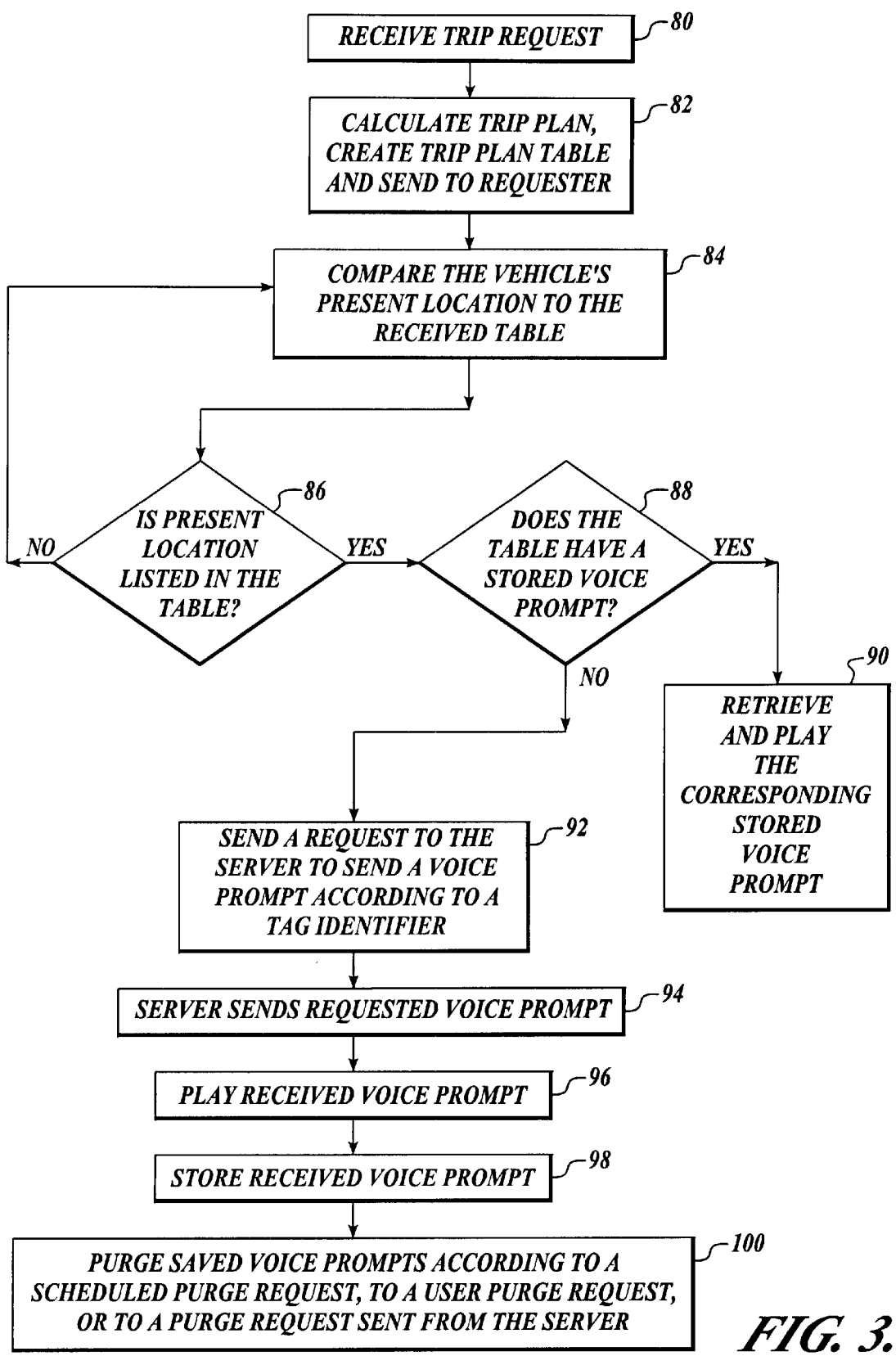

FIG. 3 is a flow diagram of an alternative process performed by system 10 shown in FIG. 1. First, at block 80, the user sends a trip request to server 16 (see blocks 50–56 of FIG. 2). At block 82, the server calculates a trip plan, creates a trip plan table according to the calculated trip plan, and sends the trip plan table to the user's TCU 14. The trip plan table includes locations and associated navigation (preferably voice) prompts. At block 84, as the user is traveling according to their trip plan, TCU 14 compares the vehicle's present location (GPS generated) to the received table. At decision block 86, if the vehicle's present location is not in the trip plan table, the process returns to block 84, where it continues comparing the vehicle's present location to the entries in the trip plan table. If there is a corresponding location entry in the trip plan table, the logic proceeds to decision block 88. At decision block 88, if the table has a corresponding stored voice prompt, TCU 14 retrieves and plays the corresponding stored voice prompt (block 90). If, at decision block 88, TCU 14 determines that a corresponding voice prompt does not exist in the table or elsewhere in memory 28, the TCU sends a request to the server to send a voice prompt according to a tag identifier that indicates the missing voice prompt (block 92). At block 94, server 16 sends the requested voice prompt. At block 96, the TCU plays the received voice prompt. At block 98, the TCU stores the received voice prompt for possible later use. At block 100, the TCU purges saved voice prompts according to a scheduled purge request, to a user purge request, or to a purge request sent from the server 16.

In an alternate embodiment, the steps performed at blocks 82–84 are performed at server 16, and the server does not send the table to the requester, but compares the vehicle's present location (GPS generated) to the server-generated table. If an associated voice prompt is present, the server sends a tag identifier associated with the voice prompt to TCU 14. The TCU compares the sent tag identifier to previously received voice prompts that are stored in memory 28 according to assigned tag identifiers. If an appropriate voice prompt is in memory 28, processor 20 retrieves it and presents it to the user via user interface 22. If a voice prompt is not found, TCU 14 sends a request to server 16 for the actual voice prompt, which is presented to the user when received from the server.

While the preferred embodiment of the invention has been illustrated and described, as noted above, many changes can be made without departing from the spirit and scope of the invention. For example, the types of communication between the vehicle and the server may be all wireless, the components of the server may be distributed over the network, and the location identifier may be a non-satellite system that determines vehicle location based on ground-based transmitters. Also, the order of the steps performed in the described embodiments may be altered without departing from the scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A vehicle navigation method comprising:

initiating a trip request, including trip request information;

determining vehicle coordinates;

sending vehicle coordinates and the entered trip request information to a server over a network;

generating a trip plan according to navigation information stored in a memory associated with the server, the vehicle coordinates, and the trip request information, wherein the generated trip plan includes a table of locations of the trip plan with associated navigation prompts;

sending the generated trip plan table to the vehicle over the network;

comparing present vehicle coordinates to the trip plan table; and if, according to the comparison, the vehicle coordinates are within a threshold value from a location in the table, presenting the navigation prompt associated with the location in the table that is within the threshold value of the vehicle's location.

2. The method of claim 1, wherein trip request information includes voice instructions.

3. The method of claim 2, wherein generating comprises determining a destination by interpreting the trip voice instructions by performing voice recognition processing.

4. The method of claim 1, wherein the navigation prompts include voice prompts.

5. The method of claim 1, further comprising determining if the vehicle is adhering to the trip plan, wherein determining adherence comprises:

determining distance of the vehicle coordinates to the trip plan; and if the vehicle coordinates are not within a threshold value from the trip plan, sending present vehicle coordinates to the server, generating a new trip plan and trip plan table based on the sent present vehicle coordinates, and sending the new trip plan table to the vehicle.

6. A vehicle navigation method comprising:

initiating a trip request;

entering trip voice instructions;

determining vehicle coordinates;

sending vehicle coordinates and the entered voice instructions to a server over a network;

generating a trip plan according to navigation information stored in a memory associated with the server, the vehicle coordinates, and the trip voice instructions, wherein the generated trip plan includes a table of locations of the trip plan with associated voice prompts;

sending the generated trip plan table to the vehicle over the network;

comparing present vehicle coordinates to the trip plan table; and if, according to the comparison, the vehicle coordinates are within a threshold value from a location in the table, presenting the voice prompt associated with the location in the table that is within the threshold value of the vehicle's location.

7. The method of claim 6, wherein generating comprises determining a destination by interpreting the trip voice instructions by performing voice recognition processing.

8. The method of claim 6, further comprising determining if the vehicle is adhering to the trip plan, wherein determining adherence comprises:

determining the distance of the vehicle coordinates to a trip plan location; and if the vehicle coordinates are not within a threshold value from the trip plan location, sending present vehicle coordinates to the server, generating a new trip plan and trip plan table based on the sent present vehicle coordinates, and sending the new trip plan table to the vehicle.

9. A vehicle navigation method comprising:

initiating a trip request;

entering trip voice instructions;

determining vehicle coordinates;

sending vehicle coordinates and the entered voice instructions to a server over a network;

generating a trip plan according to navigation information stored in a memory associated with the server, the vehicle coordinates, and the trip voice instructions, wherein the generated trip plan includes a table of locations of the trip plan with associated one or more identifiers;

sending the generated trip plan table to the vehicle over the network;

comparing present vehicle coordinates to the trip plan table;

if, according to the comparison, the present vehicle coordinates are within a threshold value from a location in the table, retrieving one or more voice prompts previously stored at the vehicle, wherein the one or more retrieved voice prompts correspond to the one or more identifiers associated with the location in the table within the threshold value from the present vehicle coordinates; and presenting the retrieved one or more voice prompts.

10. The method of claim 9, wherein:

retrieving comprises when a voice prompt is not previously stored at the vehicle, sending a request to the server for the non-stored voice prompt and sending the non-stored voice prompt from the server to the vehicle; and presenting comprises presenting the sent voice prompt.

11. The method of claim 10, wherein retrieving further comprises saving the sent voice prompt according to the corresponding identifier.

12. The method of claim 9, further comprising purging saved voice prompts according to a scheduled purge request.

13. The method of claim 9, further comprising purging saved voice prompts according to a user purge request.

14. The method of claim 9, further comprising purging saved voice prompts according to a server generated purge request.

15. A vehicle navigation method comprising:

initiating a trip request;

entering trip voice instructions;

determining vehicle coordinates;

sending vehicle coordinates and the entered voice instructions to a server over a network;

generating a trip plan according to vehicle navigation information stored in a memory associated with the server, the vehicle coordinates, and the trip voice instructions, wherein the generated trip plan includes a table of locations of the trip plan and each location entry in the table includes an associated voice prompt;

comparing present vehicle coordinates to the trip plan table; and if, according to the comparison, the vehicle coordinates are within a threshold value from a location in the table, retrieving at least one of a voice prompt or voice prompt tag identifier, sending the retrieved at least one of a voice prompt or voice prompt tag identifier to the vehicle, and presenting the sent voice prompt or a previously stored voice prompt associated with the sent voice prompt tag identifier.

16. A vehicle navigation system comprising:

a computer-based vehicle unit located in a vehicle for receiving and transmitting trip request information and receiving trip plan navigation information, the computer-based vehicle unit having a processor and associated memory, a user interface, a global positioning system for determining vehicle coordinates, and a radio unit;

a network configured to wirelessly send and receive trip request information to and from the vehicle unit via the radio unit; and a computer-based server in communication with the network for receiving trip request information from the computer-based vehicle unit, generating a trip plan according to navigation information stored in a memory associated with the server and the trip request information, and sending the generated trip plan to the vehicle unit over the network.

17. The system of claim 16, wherein the generated trip plan includes a table of locations of the trip plan with associated navigation prompts.

18. The system of claim 17, wherein:

the computer-based vehicle unit compares present vehicle coordinates to the trip plan table; and if, according to the comparison, the vehicle coordinates are within a threshold value from a location in the table, the vehicle unit presents the navigation prompt associated with the location in the table that is within the threshold value of the vehicle's location.

19. A vehicle navigation apparatus comprising:

means for initiating a trip request;

means for entering trip voice instructions;

means for determining vehicle coordinates;

means for sending vehicle coordinates and the entered voice instructions to a server over a network;

means for generating a trip plan according to vehicle navigation information stored in a memory associated with the server, the vehicle coordinates, and the trip voice instructions, wherein the generated trip plan includes a table of locations of the trip plan and each location entry in the table includes an associated voice prompt;

means for comparing present vehicle coordinates to the trip plan table; and if, according to the comparison, the vehicle coordinates are within a threshold value from a location in the table, means for retrieving at least one of a voice prompt or voice prompt tag identifier, means for sending the retrieved at least one of a voice prompt or voice prompt tag identifier to the vehicle, and means for presenting the sent voice prompt or a previously stored voice prompt associated with the sent voice prompt tag identifier.

20. A vehicle navigation apparatus comprising:

means for initiating a trip request;

means for entering trip voice instructions;

means for determining vehicle coordinates;

means for sending vehicle coordinates and the entered voice instructions to a server over a network;

means for generating a trip plan according to navigation information stored in a memory associated with the server, the vehicle coordinates, and the trip voice instructions, wherein the generated trip plan includes a table of locations of the trip plan with associated one or more identifiers;

means for sending the generated trip plan table to the vehicle over the network;

means for comparing present vehicle coordinates to the trip plan table;

if, according to the comparison, the present vehicle coordinates are within a threshold value from a location in the table, means for retrieving one or more voice prompts previously stored at the vehicle, wherein the one or more retrieved voice prompts correspond to the one or more identifiers associated with the location in the table within the threshold value from the present vehicle coordinates; and means for presenting the retrieved one or more voice prompts.

21. A vehicle navigation apparatus comprising:

means for initiating a trip request;

means for entering trip voice instructions;

means for determining vehicle coordinates;

means for sending vehicle coordinates and the entered voice instructions to a server over a network;

means for generating a trip plan according to navigation information stored in a memory associated with the server, the vehicle coordinates, and the trip voice instructions, wherein the generated trip plan includes a table of locations of the trip plan with associated voice prompts;

means for sending the generated trip plan table to the vehicle over the network;

means for comparing present vehicle coordinates to the trip plan table; and if, according to the comparison, the vehicle coordinates are within a threshold value from a location in the table, means for presenting the voice prompt associated with the location in the table that is within the threshold value of the vehicle's location.

* * * * *